United States Patent

[11] 3,597,817

| | | |
|---|---|---|
| [72] | Inventor | Howard M. Whalley<br>6742 Stafford Drive, Mayfield Heights, Ohio 44124 |
| [21] | Appl. No. | 808,866 |
| [22] | Filed | Mar. 20, 1969 |
| [45] | Patented | Aug. 10, 1971 |

[54] TEE-SLOT CUTTER AND METHOD FOR USING IT
1 Claim, 5 Drawing Figs.

[52] U.S. Cl. .................................................. 29/106, 29/103 A
[51] Int. Cl. .................................................. B26d 1/00, B26d 1/12
[50] Field of Search ........................................... 29/106, 103, 105, 105.1; 90/11

[56] References Cited
UNITED STATES PATENTS
| | | | |
|---|---|---|---|
| 582,081 | 5/1897 | Newton ..................... | 29/103 X |
| 1,385,750 | 7/1921 | Pollock ..................... | 29/103 |
| 3,037,264 | 6/1962 | Mossberg ................... | 29/106 |
| 3,183,779 | 5/1965 | Nagel ........................ | 90/11 |
| 3,370,508 | 2/1968 | Iaia ............................. | 90/11 |

FOREIGN PATENTS
| | | | |
|---|---|---|---|
| 188,687 | 4/1964 | Sweden ..................... | 29/103 |
| 11,673 | 5/1910 | Great Britain ............. | 29/106 |
| 537,624 | 1956 | Italy .......................... | 29/103 |

*Primary Examiner*—Harrison L. Hinson
*Attorney*—Alfred H. Lobo

ABSTRACT: A tee-slot cutter for cutting T-shaped slots, as for example, in the metal table of a milling machine, at high speeds, without sacrificing tool life by providing liquid coolant through the openings near the hub of the cutting bit and away from the cutting edges, to direct liquid streams immediately in front of the cutting edges.

Patented Aug. 10, 1971 3,597,817
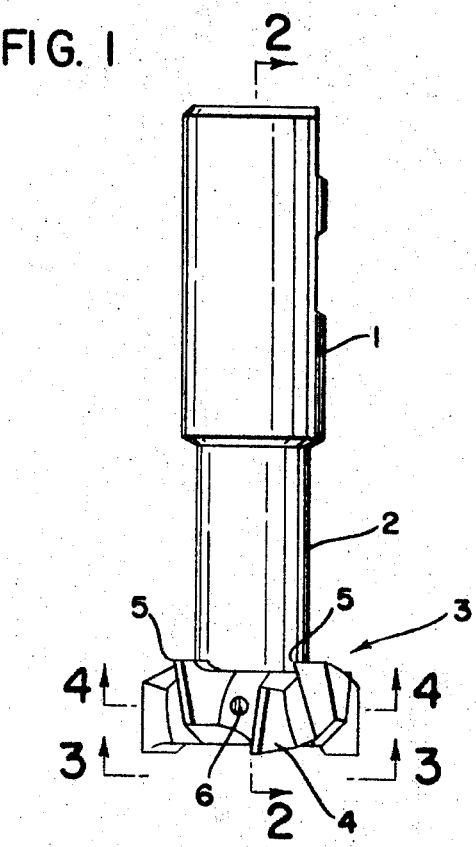
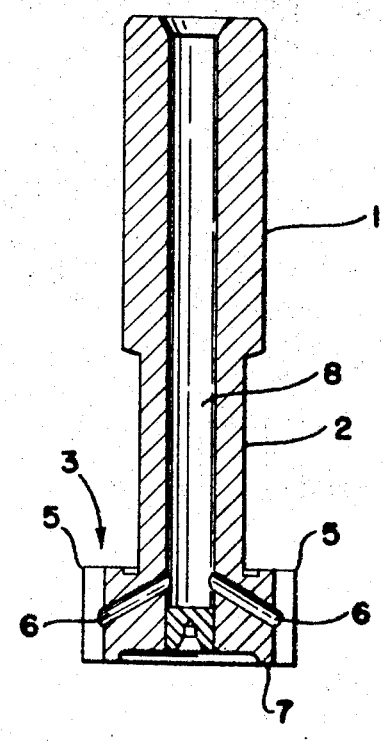
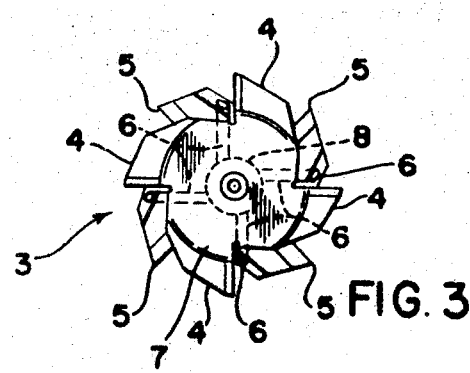
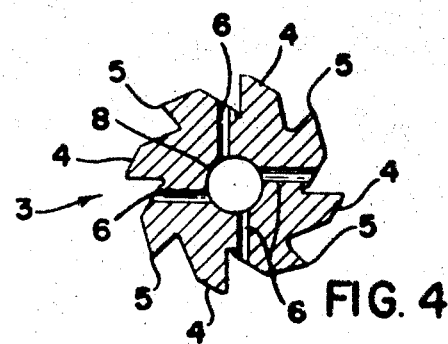
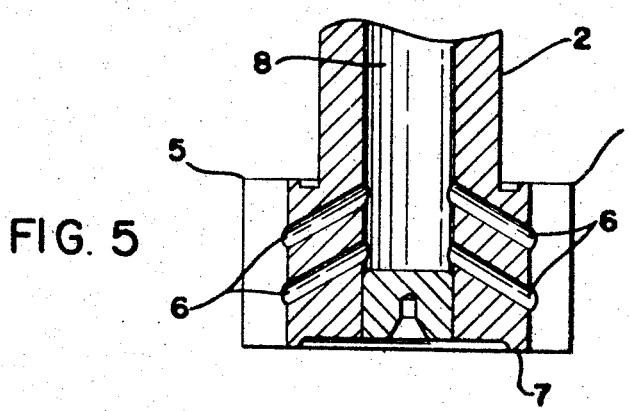
INVENTOR.
HOWARD M. WHALLEY
BY Alfred A. Lobo
ATTORNEY

TEE-SLOT CUTTER AND METHOD FOR USING IT

BACKGROUND OF THE INVENTION

The present invention relates to power-operated tools and more particularly to power-operated milling machines employed for cutting tee-slots in metal workpieces, as for example, the steel-machining table of a milling machine. It is not known whether the cutting tool acquired its name because a cross-sectional end view of a machining table appears as a row of solid T's or because the slots in the table appear as inverted T's alternating with the row of solid metal T's, but in any event, inverted T-slots, or tee-slots, are provided in a machine table to permit the insertion of nuts and bolts to fasten down the workpiece to the table. Tee-slots are usually cut in at least two operations. First a slot corresponding to the stem of the T is cut, usually the length of the machine table, and then the arms of the T are cut by the tee-slot cutter, the cutting teeth of which are disposed on the end of a shank, said shank having a diameter smaller than the width of the stem slot previously cut. Since cutting tee-slots in machining tables is a time-consuming task which, when hurried, takes its toll in tool life, much effort has been devoted to coping with this problem.

Similar problems arise in a large number of metal-machining operations such as sawing, turning, boring, reaming, and drilling. A well-known advance in the art of drilling is embodied in the oilhole drill, particularly one which is cooled by a pulsed fluid coolant as disclosed in U.S. Pat. No. 3,342,086, in which oilholes are provided through the approximate center of each flute of a drill and which open near the cutting end immediately behind the cutting edges.

SUMMARY OF THE INSTANT INVENTION

It is an object of the instant invention to provide a tee-slot cutter with radially extending passages or 'oilholes' in the hub of the cutting tool, said oilholes being adapted to direct streams of liquid coolant immediately in front of the cutting edge of each cutting tooth.

It is another object of the instant invention to provide a tee-slot cutter with at least six cutting edges obliquely disposed to both the vertical and horizontal axes of the shank, with at least one radially extending oilhole adapted to direct a liquid coolant stream immediately in front of each cutting edge.

It is a further object of the instant invention to provide a tee-slot cutter capable of cutting at a rate per minute in excess of twice the diameter of the cutting tool or bit.

It is yet another object of the instant invention to provide a method for cutting a tee-slot characterized by the formation of a substantially uniform chip with a width corresponding to the width of a cutting edge.

It is still another object of the instant invention to provide a method of prolonging tool life at cutting speeds at least twice as high as tee-slot cutters provided with external liquid coolant means, by cutting a relatively large chip and simultaneously providing a hole in the chip to permit fluid to go through the chip and into the 'hot zone' at the cutting edge of the tool.

BRIEF DESCRIPTION OF THE DRAWINGS

FIG. 1 is an elevational view of a tee-slot cutter including the embodiment of the instant invention.

FIG. 2 is a sectional view of the tee-slot cutter illustrated in FIG. 1, along the section 2-2.

FIG. 3 is an end view of the tee-slot cutter illustrated in FIG. 1.

FIG. 4 is a sectional view of the tee-slot cutter, taken along the section 4-4 in FIG. 1.

FIG. 5 is a sectional view of the cutting teeth of a cutting tool, in excess of 3 inches in diameter, in which two radially extending passages are provided between successive cutting teeth

DESCRIPTION OF THE PREFERRED EMBODIMENT

Referring more particularly to the drawings wherein similar reference characters designate corresponding parts throughout the several views, FIG. 1 illustrates a tee-slot cutter designated generally as 1 which comprises a cylindrical shank 2 and a cutting head 3 disposed at the end of shank 2. The cutting head 3 is provided with a plurality of cutting teeth 4 with cutting edges 5. The cutting teeth are preferably offset as to successive teeth in an upper and a lower row, all teeth in the upper row having cutting edges with the same rake or angle, and the lower row having cutting edges with a different angle from those in the upper row. The cutting tool has, preferably, at least six cutting teeth and all cutting edges are obliquely angled to both the vertical and horizontal axes of the shank 2.

Passages or 'oilholes' 6, shown in FIGS. 2—5, are provided between successive cutting teeth near the base thereof, near the hub 7 and away from and on the opposite side of the cutting edge 5 of each tooth. The oilholes 6 extend radially from the shank 2 and communicate with an axial passage 8 in the shank 2. The oilholes 6 are drilled at an angle selected so as to direct a stream of liquid coolant immediately in front of the cutting edge of the next following cutting tooth. Any suitable liquid coolant may be used, the cutting oils for high-speed machining operations being preferred. Most preferred is the use of a pulsed liquid coolant described in the patent mentioned hereinbefore.

Oilhole drills are well known in the art and it is noted that the liquid coolant is introduced immediately behind each of two cutting edges of the drill with the result that a liquid stream does not directly impinge upon the metal chip being formed immediately in front of the cutting edge. It is a particularly surprising feature of the instant invention that substantially uniform chips are formed irrespective of the metal machined. This aspect of machining with the instant tee-slot cutter extends even to cast iron where, normally, a grit or sand of random shape is formed whether or not any external liquid coolant is utilized. It will be recognized that conventional practice is to avoid using a coolant when machining cast iron since the grit formed tends to clog the cutting edges. Thus formation of a relatively large chip is of unexpected help in that it permits the easy flushing of the chips away from the cutting zone.

A further unexpected aspect of machining with the instant tool is that, with mild steels in particular, a substantially uniform, foraminous chip is formed. The height of the chip corresponds substantially to the height of the cutting edge, the width varying somewhat depending on the rate of rotation of the cutting head. It is speculated that the hole formed in each chip aids materially in cooling the hot zone near the cutting edge by permitting relatively easy passage of fluid through the hole. An unexpected benefit of forming the uniform chips described hereinbefore is that they are large enough not to interfere with the cutting action of the teeth but small enough to be flushed through the tee-slot as it is being cut.

For illustration, in an actual comparison of an externally cooled tee-slot cutter and an article of the instant invention, both of identical 1 15/32-inch diameters, run at 368 r.p.m. in class 030 gray iron, the externally cooled cutter cut at a speed of 3½ inches/min. compared to 15 inches/min. for the oilhole cutter with pulsed coolant. In 1020 hot-rolled steel the externally cooled cutter cut at a speed of 3 inches/min. compared to 12.5 inches/min. for the oilhole cutter with pulsed coolant.

In general it was found that, even for large tee-slot cutters having a diameter in the range from about 3 inches to about 6 inches, the cutting rate in inches per minute exceeded twice the diameter of the cutting tool. For example a 3-inch diameter tee-slot cutter at 300 r.p.m. cut 1020 hot-rolled steel at a rate of 9.8 inches/min. and a 4¼-inch diameter cutter at 276 r.p.m. cut 1020 hot-rolled steel at 8.75 inches/min.

In general, the smaller the diameter of the tee-slot cutter, the faster it can cut. The practical lower limit of diameter for tee-slot cutters of the instant design is 0.75 inches as it has been found that smaller diameters incur a serious breakage problem on the cutting teeth. In tests, a tee-slot cutter with a 1¼-inch diameter maintained a cutting speed of 20 inches/min. at 410 r.p.m. with pulsed liquid coolant, a speed which is approximately 16 times the diameter of the cutting tool. Each of the above 3-inch and 4¼-inch diameter tee-slot cutters were provided with two oilholes between successive teeth to provide sufficient liquid coolant flow.

In each of the foregoing comparisons it should be noted that at the cutting speeds of the externally cooled tee-slot cutters, pushed to their limits as they were, the quality of the cut was poor and the randomly shaped chips were blue; in the oilhole tee-slot cutter, the quality of the cut was extremely good and the uniform chips were 'white' indicating the ease with which the cut is made.

It will be apparent that a comparison of wear, under conditions were the externally cooled tee-slot cutter is operating at its limit, would not be meaningful in relation to an oilhole tee-slot cutter not so stressed. Suffice it to exemplify the improvement of tool life by the fact that in all tests conducted, the life of a tee-slot cutter of the instant invention, operating normally, was more than three times as long as an externally cooled tee-slot cutter of the same diameter, operating at its normal speed.

I claim:

1. In a tee-slot cutter comprising in combination a shaft, a cutting bit disposed on one end of said shaft, said cutting bit having radially extending cutting teeth equipped with cutting edges obliquely disposed relative to both the vertical and horizontal axes of said shaft, the improvement consisting of said shaft having a shaft passage extending axially from near said one end to the other end of said shaft, said shaft passage being closed near said one end and open at said other end, and said cutting bit having at least as many radially extending passages as the bit has cutting teeth, the inlets of said passages being disposed substantially uniplanarly and the outlets of said passages being disposed substantially uniplanarly so as to provide essentially the same fluid pressure at each exit of said passages in a particular plane, the angle of said radially extending passages being such as to direct individual streams of liquid coolant forced through said passages to points immediately in front of said cutting teeth.